3,037,944
SULFONIUM DERIVED ANION EXCHANGING AND CHELATING RESINS HAVING PRIMARY AMINO GROUPS
Leo R. Morris, Midland, Mich., assignor to The Dow Chemical Company, Midland, Mich., a corporation of Delaware
No Drawing. Filed Jan. 14, 1959, Ser. No. 786,631
4 Claims. (Cl. 260—2.1)

This invention concerns a method for making polyalkylene polyamine anion exchanging and chelating resins having free amino groups and the products thereof.

Conventional amine type anion exchanging resins which are highly crosslinked are slow in attaining equilibrium in various reactions. They are usually prepared by reacting a halomethylated vinylaryl resin, e.g., chloromethylated or bromomethylated crosslinked polystyrene, with a polyalkylene polyamine such as diethylene triamine. Reaction involves both the primary and secondary amino groups. As a consequence, at least about half of the primary amino groups are reacted as well as a substantial proportion of the secondary amino groups. The reaction thus unavoidably gives rise to a relatively highly crosslinked product, slow in attaining equilibrium.

It has now been discovered that by forming a Schiff's base by the interaction of an aldehyde having not more than three carbon atoms with the primary amino groups of those polyalkylene polyamines heretofore used to make conventional polyamine anion exchanging resins (e.g., those containing at least one secondary amino group and two primary amino groups, having the general formula: $H_2N(CH_2CH_2NH)_xH$, wherein $x$ ranges between 2 and 5) and then reacting the Schiff's base with a 1 to 4 weight percent crosslinked vinylaryl sulfonium halide polymer, reaction then takes place to give a much less crosslinked product. Thereafter the aldehyde is removed by acid hydrolysis, to give a resin having polyalkylene polyamine substituents. Performance characteristics suggest that the resin products may have a preponderance of polymeric units of the prototype formula:

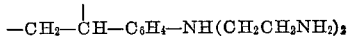

$$-CH_2-CH-C_6H_4-NH(CH_2CH_2NH_2)_2$$

when diethylene triamine is the polyalkylene polyamine.

The polymeric vinylaryl sulfonium halides used in this invention are those described in U.S. patent application Serial No. 769,545, filed October 27, 1958, prepared by reacting a polymeric vinylbenzyl chloride or bromide having between about 0.5 and 1.2 halomethyl groups per aryl nucleus and crosslinked with between about 1 and 4 weight percent of a divinylaryl hydrocarbon, with a sulfide of the dialkyl, alkylhydroxyalkyl, di(hydroxyalykyl), polymethylene and alkyl-substituted polymethylene sulfide types having alkyl groups containing between 1 and 4 carbon atoms, hydroxyalkyl groups containing between 2 and 4 carbon atoms and polymethylene groups containing between 4 and 8 carbon atoms. They are swellable in aqueous solution, hence no organic swelling agents are needed.

The polyalkylene polyamine reactants contain between 2 and 5 alkylene groups and advantageously encompass diethylene triamine through pentamethylene hexamine. Of these, diethylene triamine is preferred. A 1 to 5 mole equivalent of amine is used for each equivalent of halomethyl.

Aldehydes such as formaldehyde, acetaldehyde and propionaldehyde as such or formed in situ from their polymers are used in forming Schiff bases with the indicated polyalkylene polyamines. Reaction temperatures between 40° and 100° C. are used, preferably between 80° and 100° C. A 1 to 3 mole equivalent of aldehyde for each equivalent of polyalkylene polyamine can be used, but 1½ to 2 mole equivalents of aldehyde per mole equivalent of polyalkylene polyamine is preferred.

In practice, the polymeric vinylbenzyl sulfonium halide is reacted in aqueous medium with the water-soluble Schiff base, which is added to the water-swollen resin in at least a stoichiometric equivalent and preferably in an excess, and reacted by heating at about 40° to about 100° C. suitably at reflux, until maximum capacity has been achieved advantageously as determined by a test sample. During reaction, sulfide is evolved and removed. Generally a reflux time of up to about 24 hours is required. Thereafter supernatant liquor is decanted or filtered off, and the resulting product is water-washed to remove most of the yellow color due to excess Schiff base. An excess of mineral acid, advantageously about six-normal hydrochloric acid, is then added with heating to reflux for up to about 8 hours to liberate aldehyde. The acid is then decanted, the resin is water-washed, washed with ammonia to neutralize acid and to convert the resin to the basic form, and again water-washed to give a chelating or anion exchanging resin product.

The following example describes a specific embodiment of this invention, it being understood that it is descriptive and not limitative of the invention, which is defined in the claims.

*Example*

A quantity of 130 g. of damp polyvinylbenzyl dimethylsulfonium chloride resin (1 percent DVB) was mixed with a solution of 30.5 g. of diethylene triamine and 18.5 g. of paraformaldehyde in 100 ml. of water. Upon heating to reflux, dimethylsulfide was liberated and collected by distillation. After heating 12 hrs. at 90° C., the resin was isolated, washed with water, and then refluxed for 5 hrs. with 12-normal hydrochloric acid. Washing of the beads with $NH_4OH$ and water gave 59.5 g. of damp, yellow-brown resin having a capacity of 2.40 mmole $Cu^{++}$ per g. of dry resin.

Any other polymeric vinylaryl sulfonium halide resin, as described above, can be substituted for the given polymeric vinylbenzyl dimethylsulfonium chloride with equally good results.

What is claimed is:

1. A method for making anion exchanging and chelating resins wherein a polymeric vinylbenzyl sulfonium halide, crosslinked with from about 1 to about 4 weight percent of a divinylaryl hydrocarbon, said copolymer containing between about 0.5 and about 1.2 sulfonium halide groups per aryl nucleus, is reacted by heating at about 40° to 100° C. with at least a stoichiometric equivalent of a Schiff base prepared from a polyalkylene polyamine having two primary amino groups and from 1 to 4 secondary amino groups and an aldehyde having from 1 to 3 carbon atoms, removing evolved sulfide, and hydrolyzing off the combined aldehyde to leave primary amino groups, said polymeric vinylbenzyl sulfonium halide having repeating units of the formula

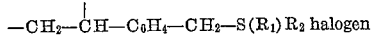

$$-CH_2-CH-C_6H_4-CH_2-S(R_1)R_2 \text{ halogen}$$

wherein $R_1$ and $R_2$ each represents a member of the group of 1 to 4 carbon alkyl groups and 2 to 4 carbon hydroxyalkyl groups and together represent polymethylene groups and 1 to 4 carbon alkyl-substituted polymethylene groups having a total of 4 to 12 carbon atoms and halogen is a member of the group of chloroide and bromide, whereby polyalkylene polyamine residues are linked at benzylic carbon atoms of said copolymer through a secondary amino nitrogen of said polyalkylene polyamine and a sulfide is evolved having the formula $R_1R_2S$, $R_1$ and $R_2$ having the significance given above.

2. The method of claim 1, wherein the sulfonium polymer reactant is polymeric vinylbenzyl dimethylsulfonium chloride containing between about 1 and 4 weight percent of divinylbenzene.

3. The method of claim 2 wherein the Schiff base is prepared from diethylene triamine and formaldehyde.

4. The method of claim 3 wherein the combined formaldehyde is hydrolyzed off with 6-normal hydrochloric acid and the resulting product is converted to the basic form with ammonium hydroxide and water washed.

References Cited in the file of this patent

UNITED STATES PATENTS

| | | |
|---|---|---|
| 2,840,533 | Hwa | June 24, 1958 |
| 2,895,925 | Hwa | July 21, 1959 |